(12) United States Patent
Glavinich

(10) Patent No.: US 6,691,450 B2
(45) Date of Patent: Feb. 17, 2004

(54) FISHING LINE SINKER ASSEMBLAGE

(76) Inventor: Larry V. Glavinich, 2985 Lincoln Ave., Suite 404, Banning, CA (US) 92220

( * ) Notice: Subject to any disclaimer, the term of this patent is extended or adjusted under 35 U.S.C. 154(b) by 0 days.

(21) Appl. No.: 09/917,485

(22) Filed: Jul. 27, 2001

(65) Prior Publication Data

US 2003/0019147 A1 Jan. 30, 2003

(51) Int. Cl.$^7$ ................................................ A01K 91/04
(52) U.S. Cl. ...................... 43/44.83; 43/4.5; 43/42.53; 43/43.1; 43/43.12; 43/44.92; 43/44.95
(58) Field of Search ............................... 43/43.1, 43.12, 43/43.14, 44.87, 44.89, 44.9, 44.91, 44.92, 44.95, 42.53, 4.5

(56) References Cited

U.S. PATENT DOCUMENTS

| | | | | | |
|---|---|---|---|---|---|
| 551,581 | A | * | 12/1895 | Crane | 43/44.8 |
| 735,235 | A | * | 8/1903 | Foust | 43/44.92 |
| 1,232,167 | A | * | 7/1917 | Arnold | 24/600.4 |
| 1,564,147 | A | * | 12/1925 | Stickley et al. | 43/43.12 |
| 1,656,440 | A | * | 1/1928 | Lemaire | 43/44.92 |
| 2,151,609 | A | * | 3/1939 | Menderman | 24/129 R |
| 2,284,564 | A | * | 5/1942 | Ebersole | 43/44.92 |
| 2,518,634 | A | * | 8/1950 | Peterson | 43/44.92 |
| 2,594,620 | A | * | 4/1952 | Braithwaite | 24/131 R |
| 2,651,133 | A | * | 9/1953 | Sharps | 43/42.28 |
| 2,701,427 | A | | 2/1955 | Vironda | |
| 2,741,057 | A | * | 4/1956 | Morris et al. | 43/42.06 |
| 2,981,029 | A | * | 4/1961 | Markoff-Moghadam | 24/131 R |
| 3,077,049 | A | * | 2/1963 | Ward | 43/44.9 |
| 3,740,803 | A | * | 6/1973 | Arteburn, Royce L. | 24/482 |
| 3,760,468 | A | * | 9/1973 | Linville | 24/601.8 |
| 4,145,833 | A | | 3/1979 | Ratte | |
| 4,459,775 | A | | 7/1984 | Ratte | |
| 4,467,550 | A | * | 8/1984 | Haulk | 43/42.53 |
| 5,444,936 | A | * | 8/1995 | McDonald | 43/42.74 |
| 5,537,775 | A | * | 7/1996 | Crumrine | 43/42.38 |
| 6,314,673 | B1 | * | 11/2001 | Matteoli | 43/43.12 |

FOREIGN PATENT DOCUMENTS

JP          2000342114  A  * 12/2000  .......... A01K/85/00

* cited by examiner

*Primary Examiner*—Kurt Rowan
(74) *Attorney, Agent, or Firm*—James E. Brunton

(57) ABSTRACT

A fishing line sinker assemblage including a streamlined weighted body that is provided with a longitudinally extending, central bore; and a fishing line securement member that is telescopically received within the central bore of the weighted body for telescopic movement between a first extended position and a second retracted position. The fishing line securement member is constructed from a length of yieldably deformable stainless steel wire and includes a line eyelet that securely grips the fishing line upon movement of the securement member from the first extended position to the second retracted position. The assemblage is fishing line sinker of a configuration such that when it is in use nothing protrudes from the sinker, such as an eyelet or swivel as found in some prior art devices, that can become tangled with weeds, grass or other debris.

5 Claims, 3 Drawing Sheets

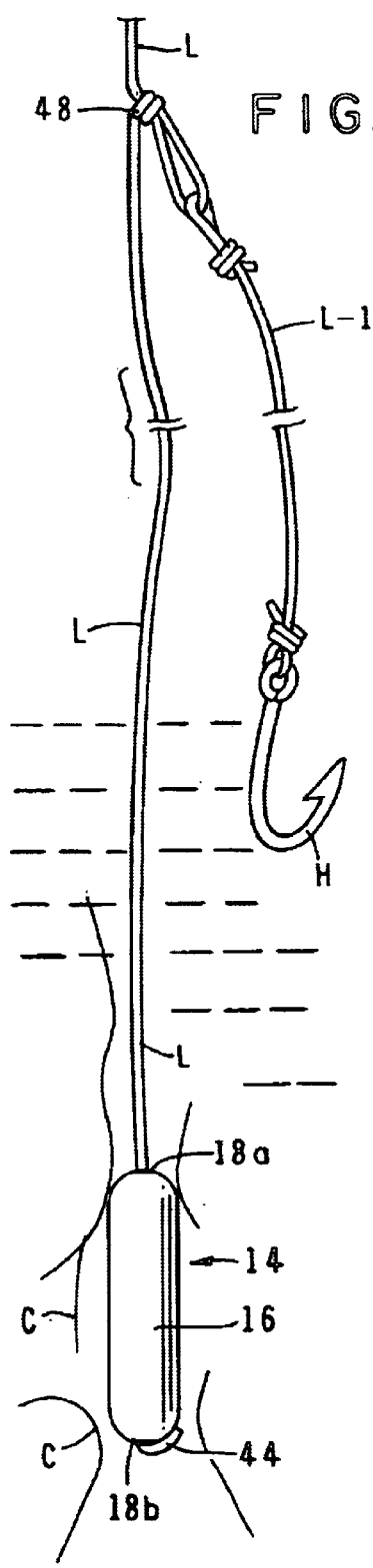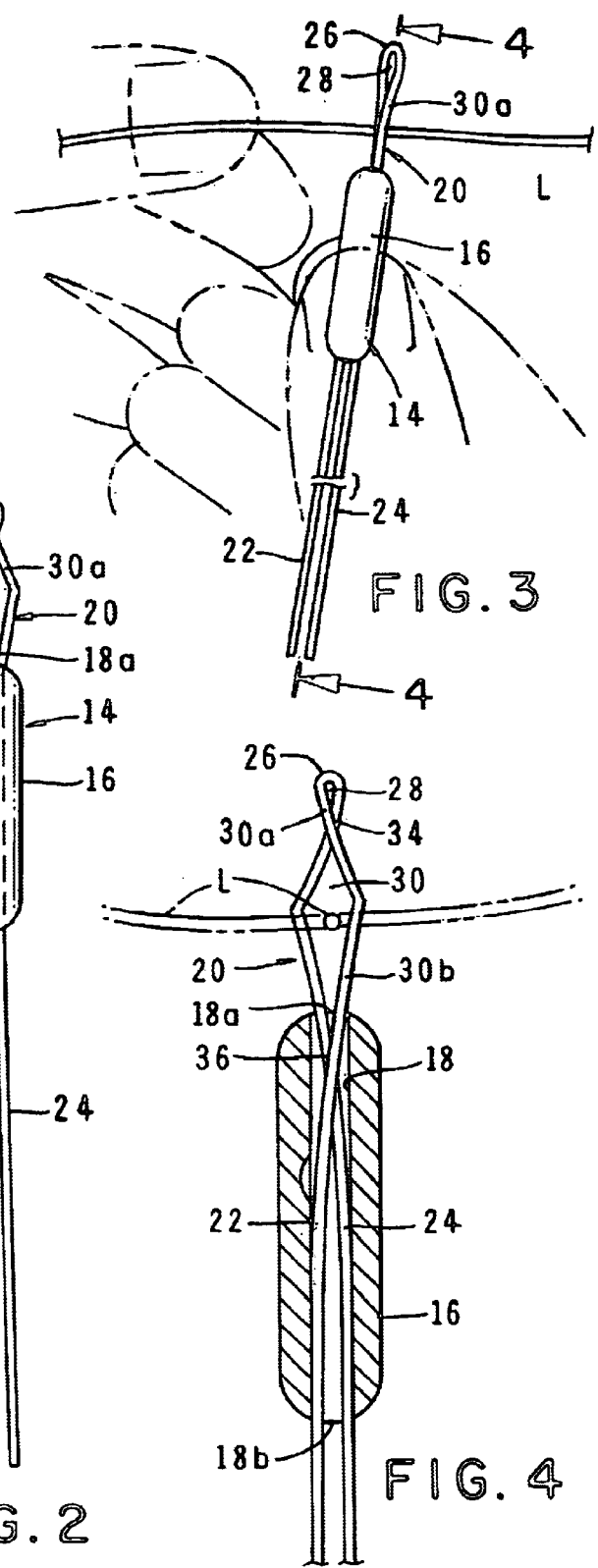

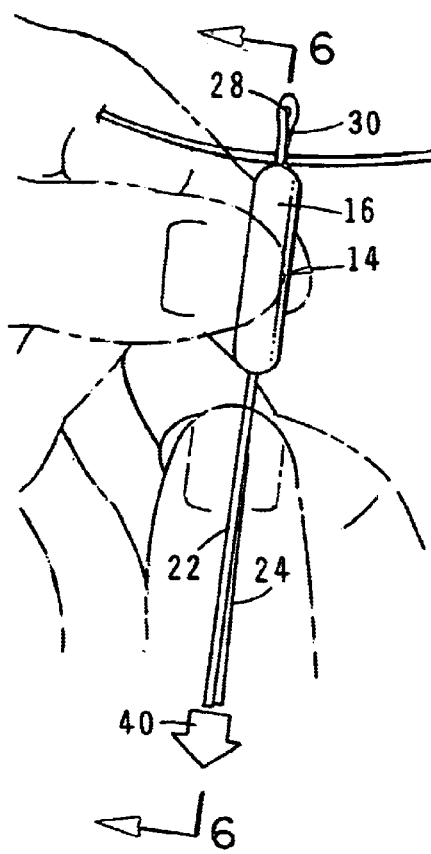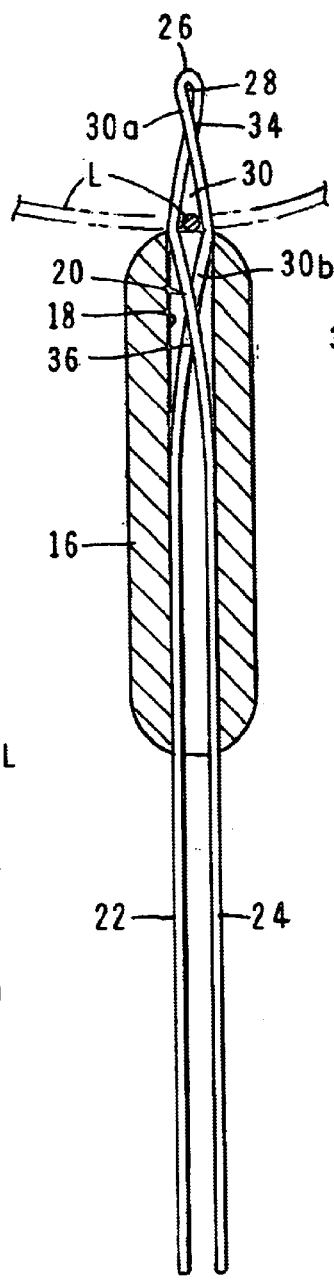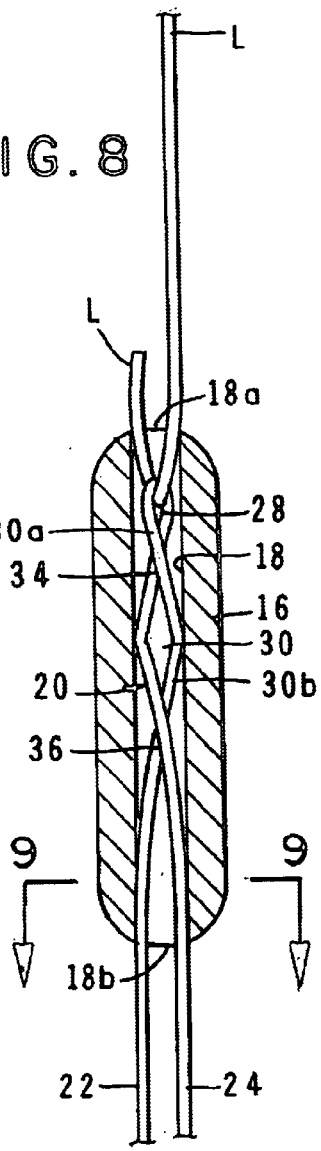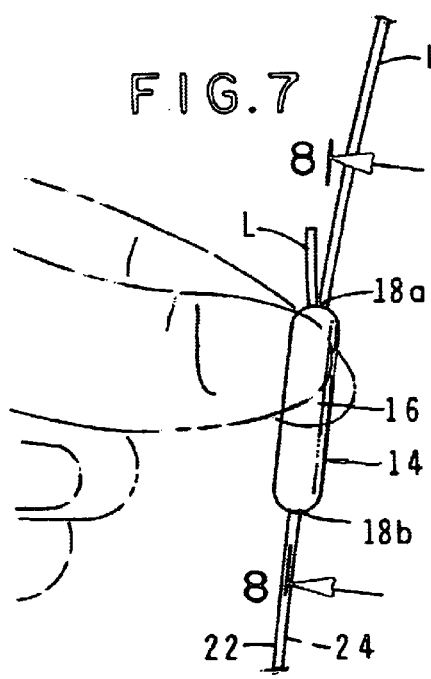
FIG. 5
FIG. 8
FIG. 7
FIG. 6
FIG. 9

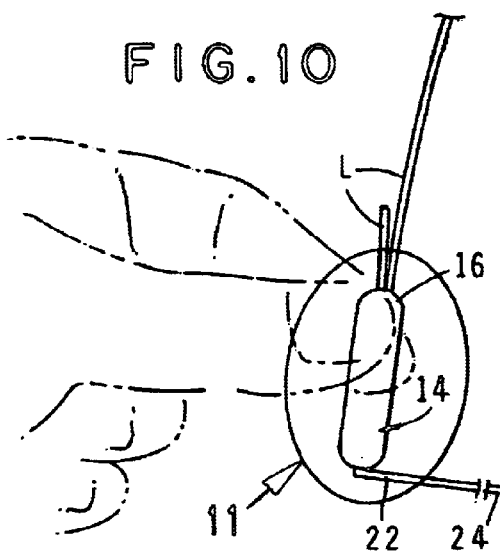
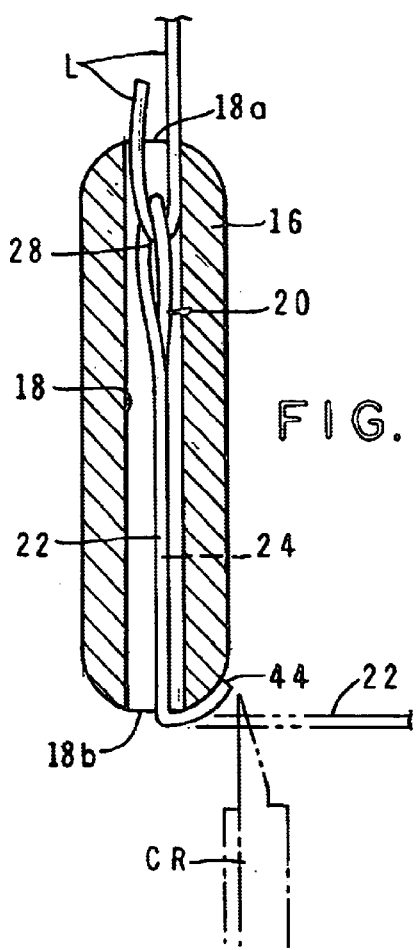
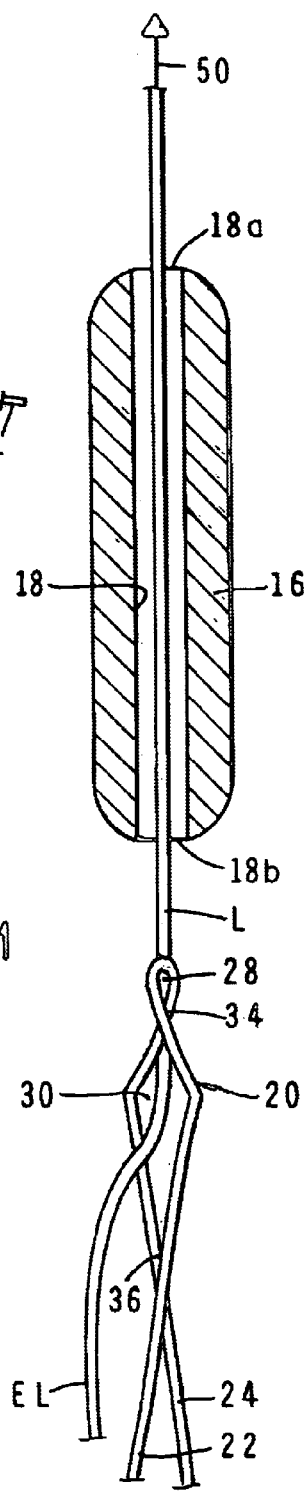
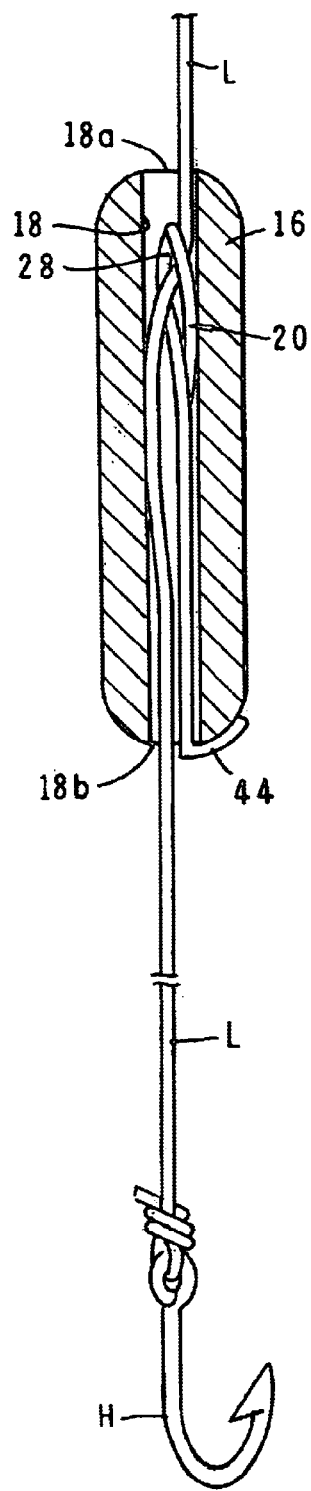

FISHING LINE SINKER ASSEMBLAGE

BACKGROUND OF THE INVENTION

1. Field of the Invention

The present invention relates generally to sinkers for use in fishing. More particularly, the invention concerns an improved, weedless sinker that can be quickly and easily attached a fishing line so that the sinker is coaxial with the fishing line.

2. Description of the Prior Art

A large number of fishing sinker designs have been suggested in the past. One very common and widely used sinker is that described in U.S. Pat. No. 2,701,427 issued to Veranda. The Veranda invention concerns a round shot type sinker having a slot that extends through the sinker. The sinker can be easily attached to a fishing line above the hook by pinching the sinker around the line. Although this type of a sinker enjoys widespread popularity, it has certain drawbacks. For example, the line usually passes through the sinker in an off-center position and the rounded stubby shape of the sinker allows the sinker to catch on weeds as it is pulled through the water.

Another highly successful type of prior art sinker in which the line passes through the center of the sinker is exemplified by a prior art sinker sold by the Mojo Lure Company of Banning Calif., which is the assignee of the present invention. This sinker has an elongated body that is provided with a centrally disposed line receiving passageway. In using this device the fishing line is first inserted through the line receiving passageway. Next, a wire threader is threaded through the central passageway of the sinker and one or more rubber strips are attached to the threader. Using the threader, the rubber strips are pulled through the sinker body in a manner to slidably affix the sinker to the line.

Still another type of sinker is shown in U.S. Pat. No. 4,145,833 issued to Ratte. This patent discloses a so-called weedless sinker having a streamline exterior shape and line holding means on the inside to hold the line within the confines of the sinker. A somewhat similar type of sinker a shown in U.S. Pat. No. 4,459,775 also issued to Ratte.

The present invention comprises an improvement to the art of weedless sinkers by providing a sinker for the coaxial attachment of the sinker to a fishing line. The sinker body has a streamlined shape and is provided with a longitudinally extending central bore that is adapted to receive both a novel line connector and a portion of the fishing line so that the line is always securely held in a central position with respect to the sinker.

SUMMARY OF THE INVENTION

By way of brief summary, the present invention comprises a fishing line sinker assemblage comprising a weighted body that is provided with a longitudinally extending, central bore; and a fishing line connector or securement means telescopically received within said central bore of the weighted body for telescopic movement between a first extended position and a second retracted position. In one form of the invention, the fishing line securement means comprising a yieldably deformable stainless steel wire securement member having line gripping means for gripping the fishing line upon movement of the securement member from the first extended position to the second retracted position.

It is an object of the present invention to provide a novel fishing line sinker of a configuration such that when the sinker is in use nothing protrudes from the sinker, such as an eyelet or swivel as found in some prior art devices, that can become tangled with weeds, grass or other debris. More particularly, it is an object of the invention to provide a sinker assemblage that when connected to the fishing line will slide and guide through the heaviest fishing cover, such as weeds grass and rocks with little tendency to snag on the fishing cover.

Another object of the invention is to provide a fishing line sinker assemblage of a configuration such that when the sinker is in use, the fishing line is symmetrically located with respect to the sinker body and the sinker body has a streamlined shape that further mitigates against snagging on weeds, grass and like fishing cover.

Another object of the invention is to provide a novel fishing line sinker that can be securely interconnected with the fishing line in a manner that will not damage the line causing the line to accidentally break during casting or during normal fishing in waters having heavy fishing cover Another object of the invention is to provide a fishing line sinker assemblage of the aforementioned character that is exceptionally easy to rig and one that can be used with most types of elongated weights having an axially extending line receiving bore.

Another object of the invention is to provide a fishing line sinker assemblage as described in the preceding paragraphs that exhibits virtually no line twist when used with bait casting and spin casting gear.

Another object of the invention is to provide a fishing line sinker as heretofore described that can be interconnected proximate the end of the fishing line, or alternatively, can be affixed to the line at a point above a hook that is affixed approximate the bottom of the line.

Another object of the invention is to provide a fishing line sinker assemblage that is of a simple construction and one that can be inexpensively manufactured in large volume.

BRIEF DESCRIPTION OF THE DRAWINGS

FIG. 1 is a generally perspective view of one form of the fishing line sinker assemblage as it appears when interconnected proximate the end of the fishing line.

FIG. 2 is a side elevational view of the fishing line sinker assemblage as it appears prior to being attached to the fishing line.

FIG. 3 is a generally illustrative view showing the manner of interconnecting the fishing line with the line retaining means of the invention.

FIG. 4 is a greatly enlarged, cross-sectional view taken along lines 4—4 of FIG. 3.

FIG. 5 is a side elevational view similar to FIG. 3, but showing the fishing line securement member being pulled downwardly into the central bore of the sinker.

FIG. 6 is a greatly enlarged, cross-sectional view taken along lines 6—6 of FIG. 5.

FIG. 7 is a generally perspective, illustrative view illustrating the appearance of the assemblage after the fishing line securement member has been pulled into bore 18.

FIG. 8 is a greatly enlarged, cross-sectional view taken along lines 8—8 of FIG. 7.

FIG. 9 is a cross-sectional view taken along lines 9—9 of FIG. 8.

FIG. 10 is a generally perspective, illustrative view illustrating the step of bending the legs of the fishing line securement member in a direction generally perpendicularly to the axis of the central bore.

FIG. 11 is a greatly enlarged, cross-sectional view of the area designated in FIG. 10 by the numeral 11.

FIG. 12 is a cross-sectional view illustrating the accomplishment of an alternate form of the method of the invention.

FIG. 13 is a cross-sectional view similar to FIG. 12, but showing the fishing line securement member having been pulled into the central bore of the weighted body in a manner such that the fishing line extends through the central bore a substantial distance so that a fishing hook can be connected to the end thereof.

DESCRIPTION OF THE INVENTION

Referring to the drawings and particularly to FIGS. 1 and 2, one form of the fishing line sinker assemblage of the present invention is there illustrated and generally designated by the numeral 14 (FIG. 2). In this form of the invention, assemblage 14 comprises a weighted body 16 having a central bore 18 (FIG. 4) having first and second ends 18a and 18b respectively. Telescopically received within central bore 18 of weighted body 16 is the important fishing line securement means of the invention for interconnecting the fishing line with the weighted body 16. This fishing line securement means here comprises a yieldably deformable line securement member 20 having line gripping means for gripping the fishing line upon movement of the securement member from a first position shown in FIG. 2 to a second line securement position shown in FIG. 8.

As best seen in FIG. 2, line securement member 20 is preferably fabricated from a malleable wire, such as, by way of example, a spring steel leader wire. Securement member 20 is bent into the general configuration shown in FIG. 6 and includes first and second legs 22 and 24 that terminate at one end 26 in a first eyelet 28. As indicated in FIG. 4, legs 22 and 24 are twisted in a manner to form a generally triangular shaped second eyelet 30 that is located proximate first eyelet 28. In the form of the invention shown in the drawings, the line gripping means of the securement member comprises first eyelet 28 which, in a manner presently to be described, securely grips the fishing line "L" after the fishing line securement means has been moved into the second position shown in FIG. 8 where it is closely contained within bore 18 of weighted body 16.

Prior to connecting the fishing line to the fishing line sinker assemblage, the assemblage has the configuration shown in FIG. 2. In this configuration, legs 22 and 24 extend a substantial distance from the second end 18b of bore 18. For a reason presently to be described, triangular shaped eyelet 30 includes, proximate end 30a thereof, a line passageway 34 (FIG. 4) that is between the wire legs in communication with first eyelet 28. Eyelet 30 also includes proximate its opposite end 30b a line passageway 36 that is between first and second twisted legs 22 and 24 and is in communication with the spaced-apart, downwardly extending legs.

In accomplishing the method of the invention, with the fishing line sinker assemblage in the starting configuration shown in FIG. 2, the fishing line "L" is threaded through eyelet 30 in the manner shown in FIGS. 3 and 4 of the drawings. This done, a downward force is exerted on legs 22 and 24 in the manner indicated by the arrow 40 in FIG. 5. The downward force exerted on legs 22 and 24 causes the triangularly shaped eyelet 30 to enter the bore 18 formed in weighted body 16 in the manner indicated in FIG. 6. As the fishing line securement means is moved into the second position shown in FIG. 8, the triangularly shaped eyelet 30 will yieldably deform in the manner shown in FIG. 8. As the eyelet 30 thusly deforms, the wires that define the eyelet will pressurally engage the inner walls of bore 18 and, because of the downward pressure exerted on the legs as illustrated in FIG. 5, a portion of the fishing line will be carried into bore 18 as shown in FIG. 8 and will slide from eyelet 30 into eyelet 28 wherein it will be securely gripped by eyelet 28 that comprises the line gripping means of the invention.

After the fishing line securement means has been moved into the position shown in FIG. 8, wherein eyelets 28 and 30 are encapsulated within bore 18, the legs 22 and 24 are next bent in a direction generally perpendicular to the axis of central bore 18 and in the manner shown in FIG. 10. After the legs have been thusly bent, they are cut by the cutters "CR" in the manner illustrated in FIG. 11. After cutting the wires, the stub ends 44 of the wire are urged into close proximity with weighted body 16 in the manner shown in FIG. 11 so that, as the weighted body moves through the fishing cover "C" (FIG. 1), neither the weighted body 16 nor the stub end 44 of the wires will snag on the cover thereby permitting the assemblage to glide and slide smoothly through the fishing cover.

From the foregoing, it is clear that stub portions 44 of the wires will securely retain the fishing line securement means within bore 18 and thereby retain line "L" within the line gripping means and within central bore 18 of the weighted body. Further, as shown in FIG. 1, when line "L" secured in position within weighted body 16 in the manner previously described, the line will be coaxially aligned with the weighted body 16 so as to further mitigate against snagging on the fishing cover as the weighted body moves through the fishing waters. The coaxial alignment of line "L" with the sinker body also functions to prevent undesirable line twist as the sinker moves through the water.

It is to be understood that, in the event that the fishing line does not initially move from eyelet 30 into eyelet 28 as the fishing line securement means is moved into the second position, forces exerted on line "L" during the casting step will cause the line "L" to slide into eyelet 28 where it will be securely retained within the weight.

In the embodiment of the invention shown in FIG. 1, it is to be noted that the fishing line sinker assemblage is affixed to the fishing line proximate the lower end thereof. In this so-called "drop shot" configuration, a leader "L-1" (FIG. 1) is used to connect the hook "H" to the line "L" at a location 48 that is intermediate the end of the line and the fishing reel. However, in the alternative method of use of the apparatus of the invention in the manner shown in FIGS. 12 and 13, the fishing line sinker assemblage of the invention is interconnected with the line "L" at the intermediate location 48 between its lower extremity, which here carries the hook "H", and the fishing reel.

Referring to FIGS. 12 and 13, this alternate method of use of the apparatus of the invention is there illustrated. As best seen in FIG. 12, the fishing line here extends through bore 18 of the sinker body 16 so that the lower end of the line extends a substantial distance downwardly from end 18b of bore 18. Accordingly, the first step in this alternate method of the invention, is to thread the line "L" through the bore 18 of body 16 in the manner shown in the drawings. This done, the end of the line "EL" is threaded through eyelet 30 in the manner shown in FIG. 12. With the line extending through the eyelet, the fishing line securement member 20 is urged upwardly and into the lower end 18b of weighted body 16. By then exerting a pulling force on the fishing line in the direction of the arrow 50 of FIG. 12, the fishing line securement means can be moved upwardly into bore 18 and into the line securement position shown in FIG. 13 with the line being securely gripped by the gripping means of eyelet 28. As before, when the line securement means is disposed interiorly of bore 18, the ends of the legs 22 and 24 can be cut and bent to form stub portion 44 (FIG. 13). Since, in this latest form of use of the apparatus, the line extends completely through the fishing line securement means and through bore 18 of weighted body 16, a hook "H" can be interconnected to the end of the line in the manner shown in FIG. 13.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A method of interconnecting a fishing line with a fishing line sinker assemblage that comprises a weighted body having a longitudinally extending, central bore of a first diameter the central bore having a central axis and first and second ends and also comprises a fishing line securement means telescopically received within the central bore, the fishing line securement means comprising a yieldably deformable line securement member having first and second legs terminating at one end in a first line receiving eyelet and being twisted to form a second eyelet adjacent to the first eyelet, the second eyelet having a second diameter greater than the first diameter of the central bore, the fishing line securement means being movable relative to the weighted body between a first position wherein the first and second eyelets are outside the first end of the central bore to a second position wherein the first and second eyelets are disposed within the central bore, the method comprising the steps of:
    (a) with the first and second eyelets in said first position, threading the fishing line through selected one of the first and the second eyelets;
    (b) moving the line securement member into the central bore to a position wherein the second eyelet is deformed and the first and second eyelets are disposed interiorly of the central bore, the fishing line being gripped within a selected one of the first and second eyelets and the legs of the securement member extending outwardly from the second end of the central bore; and
    (c) bending at least one of the legs perpendicularly relative to the central axis of the bore.

2. The method as defined in claim 1, including the further step of following the bending step, cutting the legs at a location proximate the second end of the central bore.

3. The method as defined in claim 2, including the further step of urging the fishing line to move from the second eyelet into the first eyelet.

4. A method of attaching a fishing line to a fishing line sinker assemblage that comprises a weighted body having a longitudinally extending, central bore of a first diameter the central bore having a central axis and first and second ends and further comprises a fishing line securement means telescopically received within the central bore, the fishing line securement means comprising a yieldably deformable line securement member having first and second legs terminating at one end in a first line receiving eyelet and being twisted to form a second eyelet adjacent to and in communication with the first eyelet, the second eyelet having a second diameter greater than said first diameter of the central bore, the fishing line securement means being movable relative to the weighted body between a first position wherein the first and second eyelets are outside the second end of the central bore to a second position wherein the first and second eyelets are disposed within the central bore, the method comprising the steps of:
    (a) threading the fishing line through the central bore of the weighted body;
    (b) with the first and second eyelets in said first position, threading the fishing line through the second eyelet;
    (c) urging the line securement member into the second end of the central bore to a position wherein the second eyelet is deformed causing the fishing line to be carried into the first eyelet and wherein the first and second eyelets are disposed interiorly of the central bore and the legs of the securement member extending outwardly from the second end of the central bore; and
    (d) bending at least one of said legs perpendicularly relative to the central axis of the bore.

5. The method as defined in claim 4 in which the fishing line terminates in a first end and in which, when the first and second eyelets are in the first position, the first end of the fishing line is threaded through the second eyelet so as to extend therefrom a substantial distance.

* * * * *